(12) United States Patent
Hirasawa (10) Patent No.: US 11,099,373 B2
(45) Date of Patent: Aug. 24, 2021

(54) OPTICAL APPARATUS

(71) Applicant: CANON KABUSHIKI KAISHA, Tokyo (JP)

(72) Inventor: Takami Hirasawa, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 91 days.

(21) Appl. No.: 16/415,297

(22) Filed: May 17, 2019

(65) Prior Publication Data

US 2019/0353889 A1    Nov. 21, 2019

(30) Foreign Application Priority Data

May 18, 2018   (JP) .............................. JP2018-095882

(51) Int. Cl.
*G02B 23/00* (2006.01)
*G02B 23/18* (2006.01)
*G02B 7/12* (2021.01)

(52) U.S. Cl.
CPC .............. *G02B 23/18* (2013.01); *G02B 7/12* (2013.01)

(58) Field of Classification Search
CPC .... G02B 23/00; G02B 23/18; G02B 23/2476; G02B 7/00; G02B 7/12
USPC ................................................ 359/411–416
See application file for complete search history.

(56) References Cited

U.S. PATENT DOCUMENTS

| 2,939,363 | A | * | 6/1960 | Kaestner | G02B 27/648 359/556 |
| 5,071,242 | A | * | 12/1991 | Yanagisawa | G02B 7/06 359/416 |
| 5,410,436 | A | * | 4/1995 | Devenyi | F16C 11/12 359/407 |
| 5,751,476 | A | * | 5/1998 | Matsui | G02B 27/0176 359/411 |

FOREIGN PATENT DOCUMENTS

| GB | 714899 | * | 9/1954 |
| JP | H0733207 Y2 | | 7/1995 |
| JP | H08136822 A | | 5/1996 |
| JP | H10170810 A | | 6/1998 |
| JP | 3794519 B2 | | 7/2006 |
| JP | 2009288612 A | | 12/2009 |

* cited by examiner

*Primary Examiner* — Thong Q Nguyen
(74) *Attorney, Agent, or Firm* — Carter, DeLuca & Farrell LLP (57) ABSTRACT

An optical apparatus includes an eye width adjustment mechanism that includes a first connecting member configured to connect a connecting portion of the right eyepiece unit on one side of a reference plane and a connecting portion of the left eyepiece unit on the other side of the reference plane to each other where the reference plane is a plane including the rotation center axes of the right and left eyepiece units, and a second connecting member configured to connect the connecting portion of the right eyepiece unit on the other side of the reference plane and the connecting portion of the left eyepiece unit on the one side of the reference plane.

6 Claims, 5 Drawing Sheets

OPTICAL APPARATUS

BACKGROUND OF THE INVENTION

Field of the Invention

The present invention relates to an optical apparatus (in particular binoculars) having an eye width adjustment mechanism.

Description of the Related Art

Some binoculars include an eye width adjustment mechanism that rotates eyepiece units for right and left eyes configured to hold eyepiece optical systems for right and left eyes relative to a body portion that holds objective optical systems for right and left eyes, and changes a lateral width (eye width) between the right and left eyepiece optical systems.

Japanese Patent No. 3794519 discloses an eye width adjustment mechanism that engages interlock portions (gear portions) integrated with the right and left eyepiece units with each other, so that as one of the right and left eyepiece units is rotated, the other is associatively rotated to change the eye width. Japanese Patent Laid-Open No. 2009-288612 discloses an eye width adjustment mechanism that transmits a rotation of a gear portion of one of the right and left eyepiece units to a gear portion of the other via two idler gears. Japanese Utility-Model Publication No. 07-033207 discloses an eye width adjustment mechanism that adjusts an eye width by rotating a right barrel for holding an objective optical system and an eyepiece optical system for the right eye, and a left barrel for holding an objective optical system and an eyepiece optical system for the left eye relative to a member configured to support these barrels. This eye width adjustment mechanism uses a connection member (interlock bar) that connects a lower portion of the right barrel and an upper portion of the left barrel to each other, and transmits a rotational force from one of the right and left barrels to the other barrel in a rotational direction opposite to that of the one barrel.

The eye width adjustment mechanism disclosed in Japanese Patent No. 3794519 increases a size of the binoculars, because the gear unit as a movable unit occupies a large rotating space in the body portion and needs to avoid interference with a battery compartment and the like in the body portion. When a gear portion and an idler gear is used as in the eye width adjustment mechanisms disclosed in Japanese Patent No. 3794519 and Japanese Patent Laid-Open No. 2009-288612, the backlash necessary for the gear rattles the eyepiece unit and lens barrel through the eye width adjustment mechanism in the rotational direction.

The binoculars disclosed in Japanese Utility-Model Publication No. 07-033207 are configured to hold the rotational position of each barrel through a relatively strong holding force in order to prevent unnecessary rotations. Thus, it is necessary to provide a strength that can overcome the holding force to an interlock lever. As a result, the configuration using only one interlock lever increases the sizes of the interlock lever itself and a connecting portion with the interlock lever in each barrel, preventing the binoculars from being made compact.

SUMMARY OF THE INVENTION

The present invention provides binoculars having a compact and rattle-preventive eye width adjustment mechanism that can reduces a space occupied by a movable member in a body.

An optical apparatus according to one aspect of the present invention includes a body portion including objective optical systems for right and left eyes, right eyepiece unit and left eyepiece unit respectively holding eyepiece optical systems for the right and left eyes, and an eye width adjustment mechanism configured to change a distance between the eyepiece optical systems for the right and left eyes in an eye width direction by rotating the right eyepiece unit and the left eyepiece unit around different rotation center axes relative to the body portion. The eye width adjustment mechanism includes a first connecting member configured to connect a connecting portion of the right eyepiece unit on one side of a reference plane and a connecting portion of the left eyepiece unit on the other side of the reference plane to each other where the reference plane is a plane including the rotation center axes of the right and left eyepiece units, and a second connecting member configured to connect the connecting portion of the right eyepiece unit on the other side of the reference plane and the connecting portion of the left eyepiece unit on the one side of the reference plane.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

First Embodiment

Figure 1:
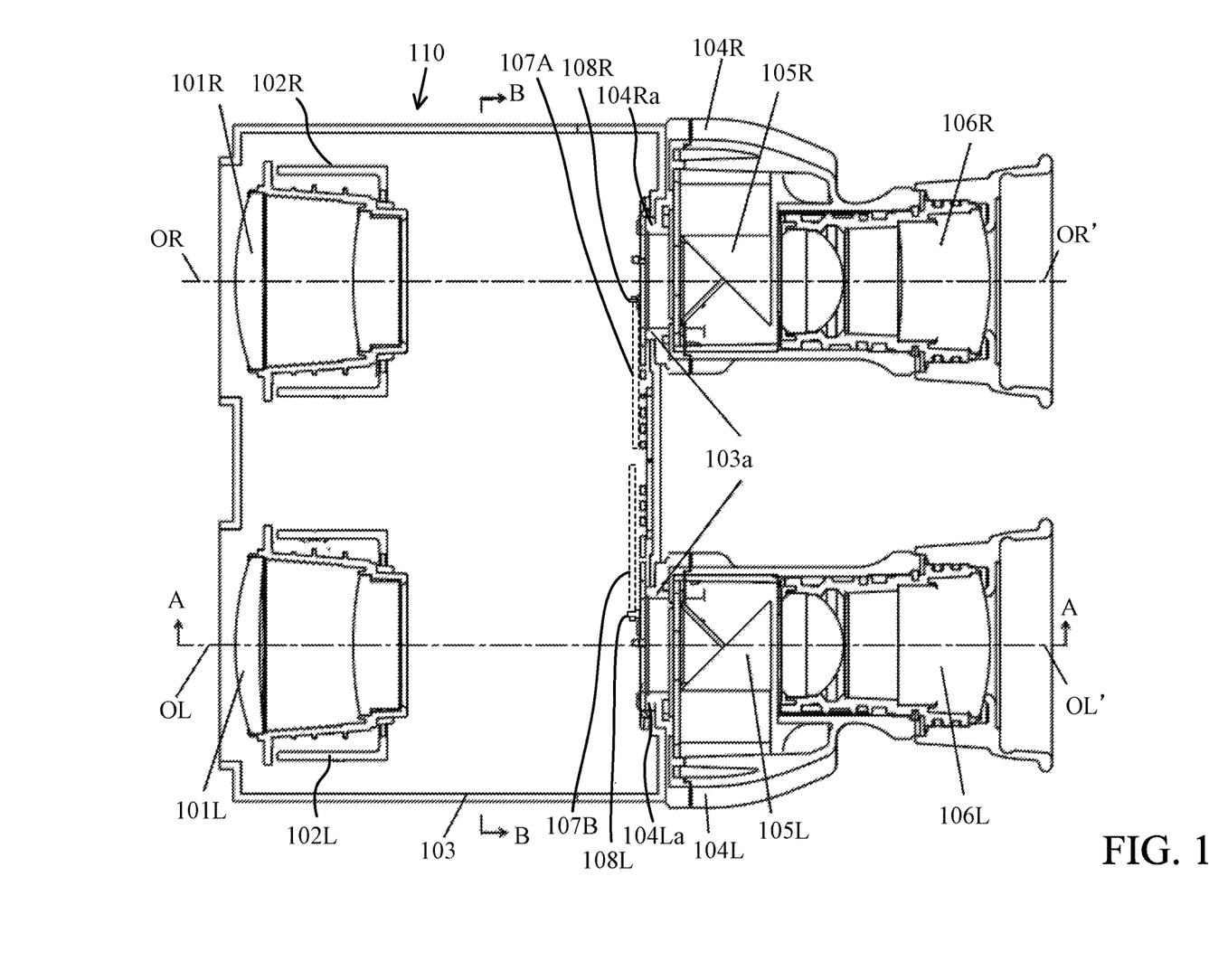
FIG. 1 is a top sectional view of binoculars according to a first embodiment.
Figure 2:
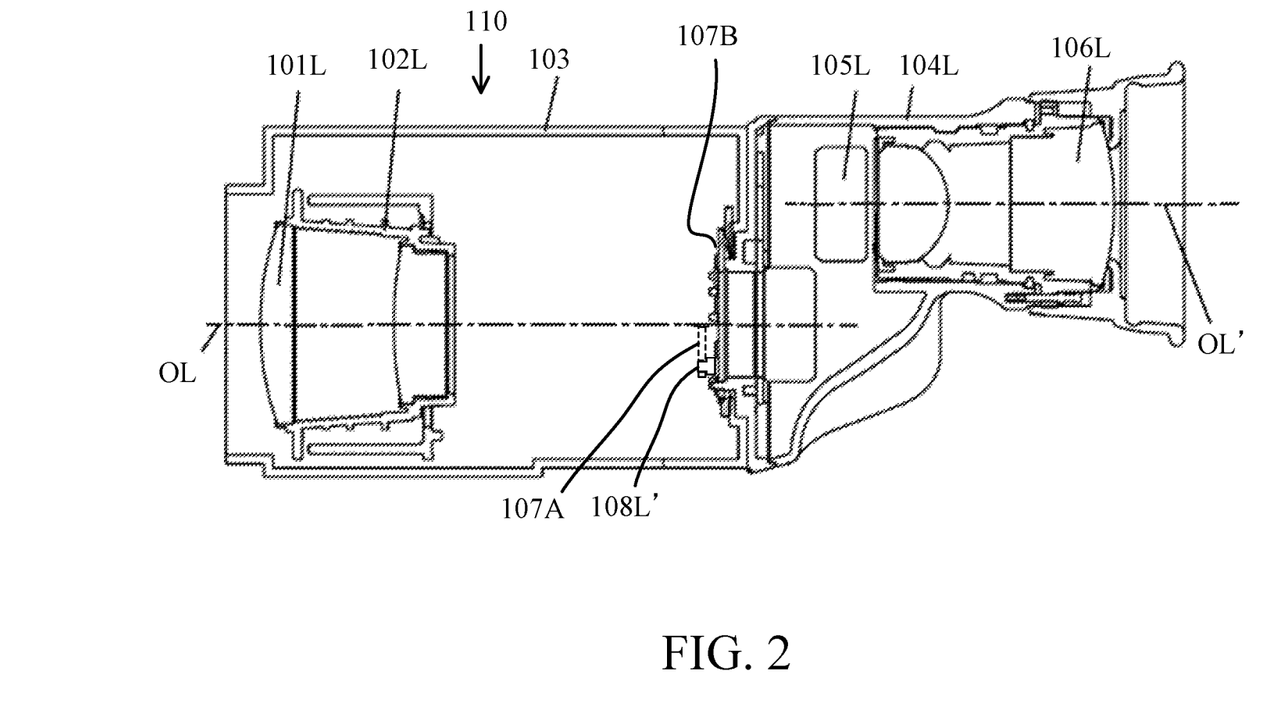
FIG. 2 is a sectional view taken along a line A-A in FIG. 1.

FIG. 1 illustrates a section of binoculars as an optical apparatus viewed from the top according to a first embodiment of the present invention. FIG. 2 illustrates a section of the binoculars according to this embodiment taken along the line A-A in FIG. 1. R attached to the reference numeral means that it is for the right eye, and L means that it is for the left eye. In the following description, the side to be observed is called a front side, and the opposite side is called a rear side.

The binoculars according to this embodiment includes an objective unit 102R and an objective unit 102L that respectively hold an objective optical system 101R for the right eye and an objective optical system 101L for the left eye on which light from an object to be observed enters, and a body member 103 that houses and holds these units. The objective units 102R and 102L and the body member 103 constitute a body portion 110 of the binoculars. OR and OL are optical axes of the objective optical systems 101R and 101L, respectively.

The binoculars further include a right eyepiece unit 104R and a left eyepiece unit 104L. The right and left eyepiece units 104R and 104L are attached to the body portion 110 rotatably around optical axes OL and OR of the objective optical systems 101R and 101L, respectively. More specifically, holding holes 103a are formed on the right and left sides of the rear end surface of the body member 103, respectively. Front end portions 104Ra and 104La of the right and left eyepiece units 104R and 104L are rotatably inserted into the holding holes 103a and protrude into the body member 103, whereby the right and left eyepiece units 104R and 104L are held in the body members 103.

The right eyepiece unit 104R holds a prism 105R constituting a regular cubic optical system and an eyepiece optical system 106R for the right eye. The left eyepiece unit 104L holds a prism 105L forming a regular cubic optical system and an eyepiece optical system 106L for the left eye. OR' and OL' are optical axes of the eyepiece optical systems 106R and 106L, respectively. The binoculars according to this embodiment includes an eye width adjustment mechanism that enables the user to freely change (adjust) the distance (or the eye width) between the optical axis OR' and OL' of the eyepiece optical systems 106R and 106L in the lateral direction (eye width direction).

Figure 3A:
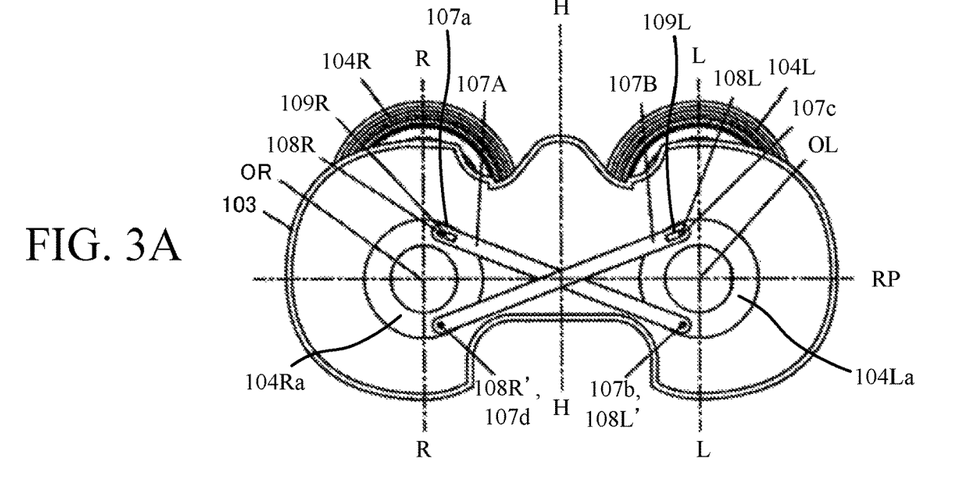
FIGS. 3A to 3C are sectional views taken along a line B-B in FIG. 1.
Figure 3B:
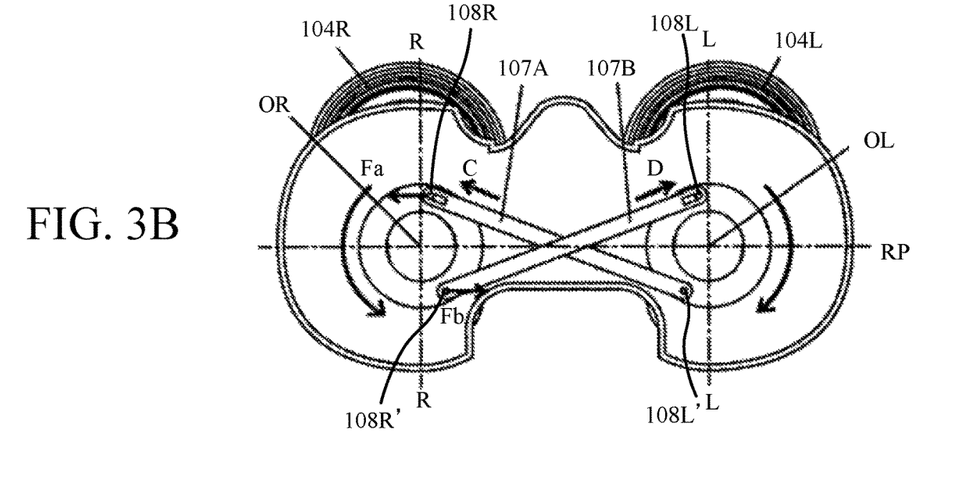
Figure 3C:
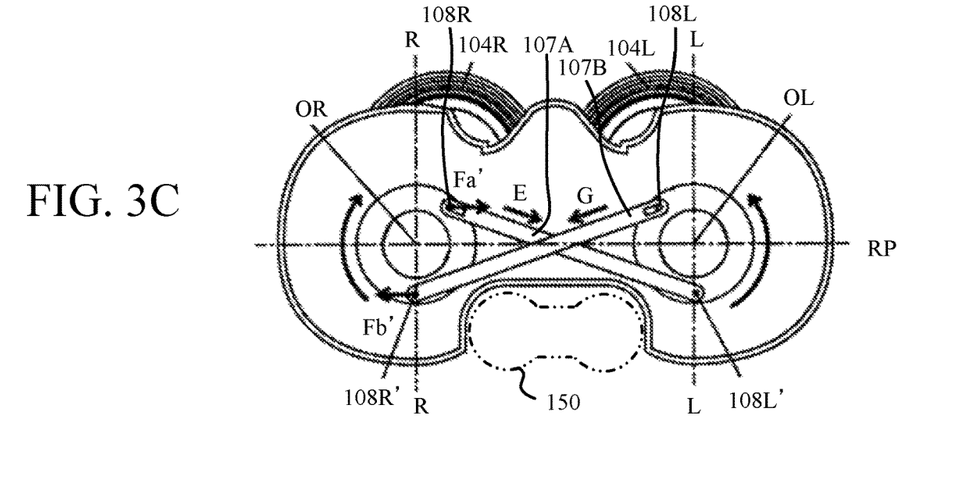

The eye width adjustment mechanism will be described with reference to FIGS. 3A to 3C. FIGS. 3A to 3C illustrate sections of the binoculars according to this embodiment taken along a line B-B in FIG. 1 viewed in the optical axis direction, and FIG. 3A illustrates an eye width as a reference eye width. FIG. 3B illustrates an eye width as a maximum eye width, and FIG. 3C illustrates an eye width as a minimum eye width.

The front end portions 104Ra and 104La protruding into the body member 103 in the right and left eyepiece units (simply referred to as eyepiece units hereinafter) 104R and 104L, as described above, include connecting shaft portions 108R and 108R' and connecting shaft portions 108L and 108L' serving as connecting portions. In FIGS. 3A-3C, RP denotes a reference plane as a plane including the optical axes OR and OL of the objective optical systems 101R and 101L or the rotation central axes of the eyepiece units 104R and 104L. R-R and L-L are perpendiculars orthogonal to the reference plane RP and passing through the optical axes OR and OL of the objective optical systems 101R and 101L, respectively.

The connecting shaft portions 108R and 108L are both provided above the reference plane RP (on one side). The connecting shaft portions 108R' and 108L' are both provided under the reference plane RP (on the other side). The connecting shaft portions 108R and 108R' are disposed at equal distances from the optical axis OR (rotation center axis described later). The connecting shaft portions 108L and 108L' are disposed at equal distances from the optical axis OL (rotation center axis).

A first connecting member 107A is provided (bridged) between the connecting shaft portions 108R and 108L'. A second connecting member 107B is provided (bridged) between the connecting shaft portions 108L and 108R'. The first and second connection members 107A and 107B intersect on the reference plane RP.

More specifically, the connecting elongate hole portion 107a is formed at one end of the first connecting member 107A, and the connecting hole portion 107b is formed at the other end. The connecting shaft portion 108R is inserted into the connecting elongate hole portion 107a, and the connecting shaft portion 108L' is inserted into the connecting hole portion 107b. The connecting hole portion 107b and the connecting shaft portion 108L' are diametrically fitted with few rattles between them. A compression coil spring 109R as a biasing member is disposed between the one end surface (inner end surface on the right side) in the longitudinal direction in the connecting elongate hole portion 107a and the connecting shaft portion 108R. The compression coil spring 109R generates a biasing force to press the connecting shaft portion 108R against the other end surface (the left end surface) in the longitudinal direction of the connecting elongate hole portion 107a, and removes rattles between the connecting elongate hole portion 107a and the connecting shaft portion 108R.

A connecting elongate hole portion 107c is formed at one end of the second connecting member 107B, and a connecting hole portion 107d is formed at the other end. The connecting shaft portion 108L is inserted into the connecting elongate hole portion 107c, and a connecting shaft portion 108R' is inserted into the connecting hole portion 107d. The connecting hole portion 107d and the connecting shaft portion 108R' are diametrically fitted with few rattles between them. A compression coil spring 109L as a biasing member is disposed between the one end surface (inner end surface on the left side) in the longitudinal direction in the connecting elongate hole portion 107c and the connecting shaft portion 108L. The compression coil spring 109L generates a biasing force to press the connecting shaft portion 108L into contact with the other end surface (right end surface) in the longitudinal direction of the connecting elongate hole portion 107c, and removes rattles between the connecting elongate hole portion 107c and the connecting shaft portion 108L.

The first and second connecting members 107A and 107B are disposed between the objective optical systems 101R and 101L and the eyepiece optical systems 106R and 106L to couple the eyepiece units 104R and 104L.

As one of the eyepiece units 104R and 104L is rotated toward the maximum eye width illustrated in FIG. 3B from the reference eye width state in FIG. 3A, the first connecting member 107A moves in an arrow C direction, and the second connecting members 107B moves in an arrow D direction, respectively. Thereby, couples Fa and Fb in parallel and opposite directions act on the eyepiece unit 104R, and couples (not shown) in parallel and opposite directions act on the eyepiece unit 104L. Thus, both eyepiece units 104R and 104L rotate in the opposite directions indicated by the arc arrows around their rotation central axes (OR, OL), and the eye width widens.

On the other hand, as one of the eyepiece units 104R and 104L is rotated toward the minimum eye width illustrated in FIG. 3C from the reference eye width state in FIG. 3A, the first connecting member 107A moves in an arrow E direction and the second connecting member 107B moves in an arrow G direction. Thereby, the eyepiece unit 104R receives couples Fa' and Fb' in parallel and in opposite directions, and the eyepiece unit 104L receives couples (not shown) in parallel and in opposite directions. Hence, both eyepiece units 104R and 104L rotate in the opposite directions indicated by the arc arrows around the rotation center axes (OR, OL), and the eye width narrows.

As described above, the rattles are eliminated between the first and second connecting members 107A and 107B and the connecting shaft portions 108R and 108L by the biasing members 109R and 109L. Thereby, the operability of the user who adjusts the eye width improves, and the eye width can be smoothly adjusted. The connecting shaft portions 108R and 108L and the connecting shaft portions 108R' and 108L' located at symmetrical positions with respect to the reference plane RP and the line H-H passing through the centers of the perpendiculars R-R and L-L can operate the above couples. As a result, the position where the first and second connection members 107A and 107B intersect can be prevented from being displaced in the vertical direction or the lateral direction.

All of the connecting shaft portions 108R, 108R', 108L and 108RL' are provided in a region between the perpendicular R-R and L-L. Thereby, even if the eye width changes between the maximum eye width and the minimum eye width, the first and second connecting members 207A and 207B are prevented from entering optical paths to the eyepiece optical systems 106R and 106L in the objective optical systems 101R and 101L, respectively.

This embodiment arranges the first and second connecting members 107A and 170B so that they intersect on the reference plane RP, and thereby secures a large empty space above and below the reference plane RP. The empty space can be used for an arrangement space of a battery compartment 150 (see FIG. 3C) for storing a battery serving as a power source for a variety of components and an image stabilization unit (not shown) in the body portion 110. The body portion 110 can be made smaller by recessing a portion of the body member 103 facing the empty space.

In this embodiment, the left and right eyepiece units 104R and 104L are interlocked and rotated by the couples generated with the intersecting first and second connecting members 107A and 107B. Thereby, the left and right eyepiece units 104R and 104L can be rotated more smoothly than when the left and right eyepiece units are interlocked with only one connecting member.

The strength required for each connection member can be reduced and the freedom degree of the material selection of each connecting member can be improved by dispersing the load (stress) of tension or compression when the eyepiece units 104R and 104L are rotated, into the first and second connecting members 107A and 107B.

Since the connecting rattles between each connection member and each eyepiece unit are reduced with the biasing members 109R and 109L, the operativity in the eye width adjustment can be improved.

Second Embodiment

Figure 4A:
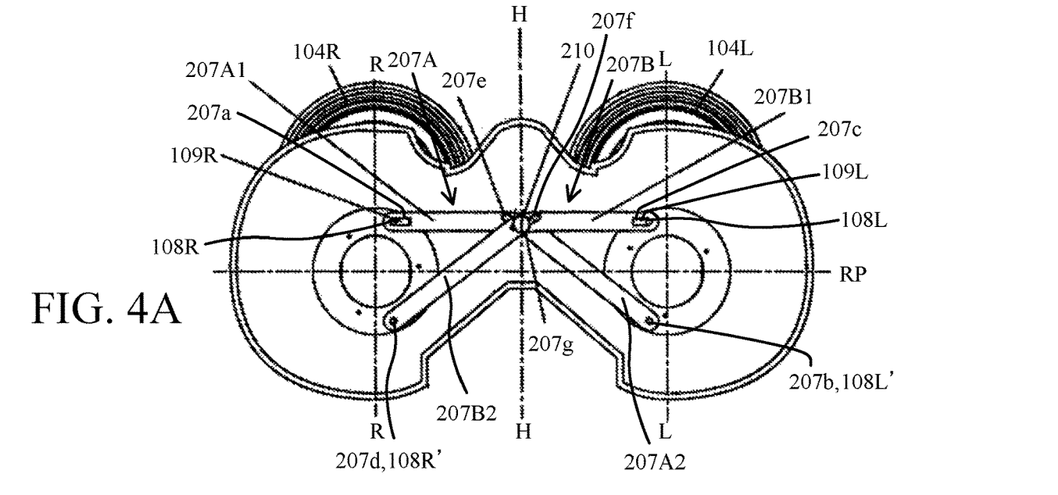
FIGS. 4A to 4C are sectional views of binoculars according to a second embodiment.
Figure 4B:
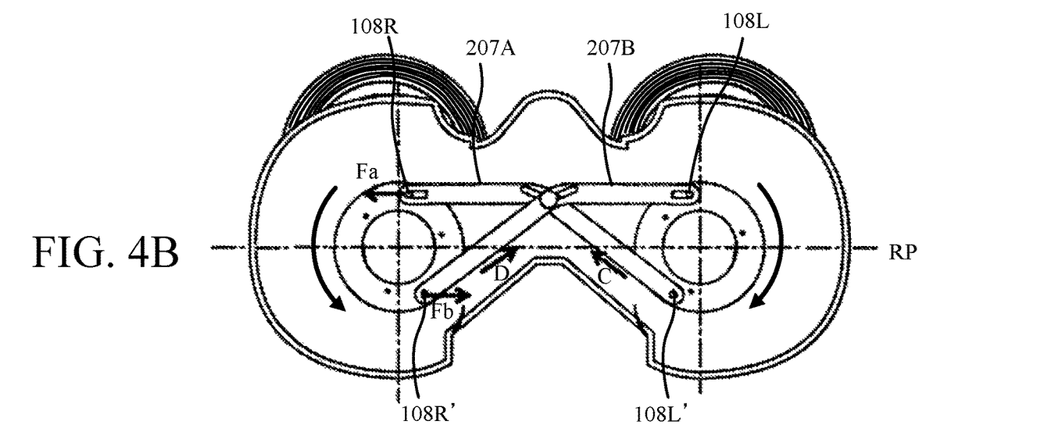
Figure 4C:
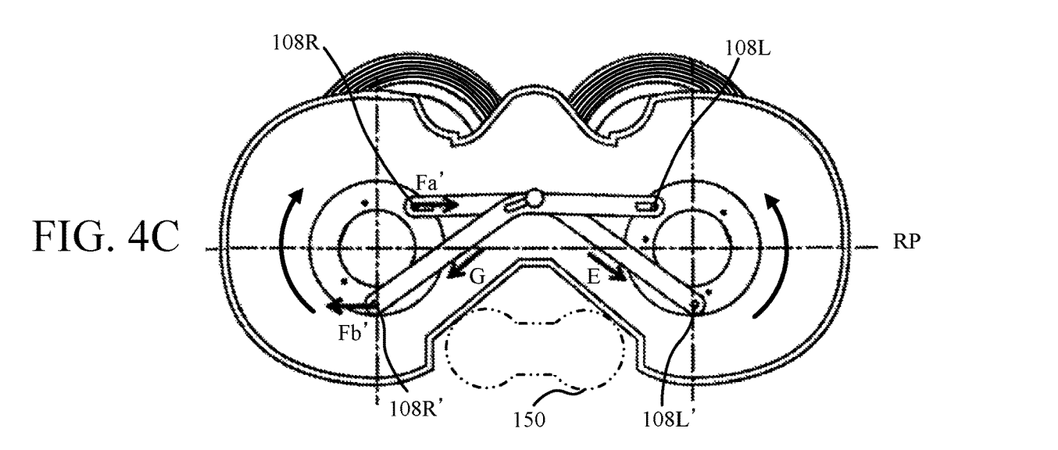

Referring now to FIGS. 4A-4C, a description will be given of an eye width adjustment mechanism in binoculars according to a second embodiment of the present invention. FIGS. 4A-4C correspond to FIGS. 3A-3C described in the first embodiment, respectively. In FIGS. 4A-4C, the same components as those illustrated in FIGS. 3A-3C will be designated by the same reference numerals as those in FIGS. 3A-3C.

A first connecting member 207A is provided (bridged) between the connecting shaft portion 108R provided on a portion of the eyepiece unit 104R above the reference plane RP and a connecting shaft portion 108L' provided on a portion below the reference plane RP of the eyepiece unit 104L. A second connecting member 207B is provided (bridged) between the connecting shaft portion 108L provided on an upper side of the reference plane RP of the eyepiece unit 104L and the connecting shaft portion 108R' provided on a lower side of the reference plane RP of the eyepiece unit 104R.

The first and second connecting members 207A and 207B include first portions 207A1 and 207B1 extending in the lateral direction above the reference plane RP, and second portions 207A2 and 207B2 that bend and extend from the ends (the upper side of the reference plane RP) to the lower side of the reference plane RP. Portions between the first portions 207A1 and 207B1 and the second portions 207A2 and 207B2 will be referred to as bending portions. The first and second connecting members 207A and 207B intersect each other around the bending portions located between the perpendiculars R-R and L-L above the reference plane RP.

Figure 5:
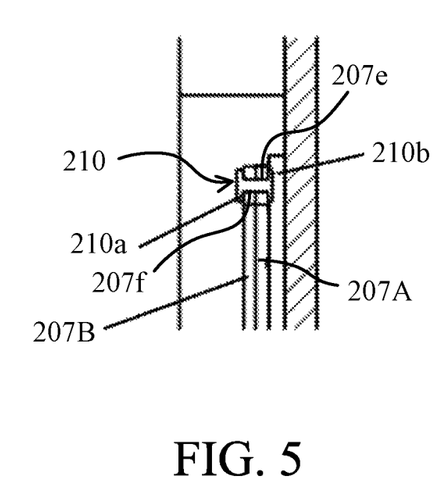
FIG. 5 is a sectional view taken along a line H-H in FIGS. 4A-4C.

Guide groove portions 207e and 207f are formed at bending portions of the first and second connecting members 207A and 207B. Guide pins 210 are inserted into the guide groove portions 207e and 207f as illustrated in FIG. 5 showing an H-H section in FIGS. 4A-4C, and fixed into the body member 103.

Similar to the first embodiment, a connecting elongate hole portion 207a is formed at one end of the first connecting member 207A, and a connecting hole portion 207b is formed at the other end. The connecting shaft portion 108R of the eyepiece unit 104R is inserted into the connecting elongate hole portion 207a, and the connecting shaft portion 108L' of the eyepiece unit 104L is inserted into the connecting hole portion 207b. The connecting hole portion 207b and the connecting shaft portion 108L' are diametrically fitted with few rattles between them. The compression coil spring 109R as the biasing member is disposed between the one end surface (the inner end surface on the right side) in the connecting elongate hole portion 207a and the connecting shaft portion 108R. The compression coil spring 109R generates a biasing force to press the connecting shaft portion 108R into contact with the other end surface (inner end surface on the left side) so as to remove rattles between the connecting elongate hole portion 207a and the connecting shaft portion 108R.

Similar to the first embodiment, a connecting elongate hole portion 207c is formed at one end of the second connecting member 207B, and a connecting hole portion 207d is formed at the other end. The connecting shaft portion 108L is inserted into the connecting elongate hole portion 207c, and the connecting shaft portion 108R' is inserted into the connecting hole portion 207d. The connecting hole portion 207d and the connecting shaft portion 108R' are diametrically fitted with few rattles between them. The compression coil spring 109L as the biasing member is disposed between the one end surface (inner end surface on the left side) in the longitudinal direction in the connecting elongate hole portion 207c and the connecting shaft portion 108L. The compression coil spring 109L generates the biasing force to press the connecting shaft portion 108L into contact with the other end surface (right end surface) in the longitudinal direction of the connecting long hole portion 207c, and removes the rattles between the connecting elongate hole portion 207c and the connecting shaft portion 108L.

Even this embodiment disposes the first and second connecting members 207A and 207B between the objective optical systems 101R and 101L and the eyepiece optical systems 106R and 106L to couple the eyepiece units 104R and 104L to each other.

As one of the eyepiece units 104R and 104L is rotated toward the maximum eye width illustrated in FIG. 4B from the reference eye width state in FIG. 4A, the guide groove portion 207e in the first connecting member 207A is guided by the guide pin 210 and moves in the arrow C direction. The second connecting member 207B moves in the arrow D direction while the guide groove portion 207f is guided by the guide pin 210. Thereby, similar to the first embodiment, the couples Fa and Fb in parallel and opposite directions act on the eyepiece unit 104R, and couples (not shown) in parallel and opposite directions act on the eyepiece unit 104L. Thus, both the eyepiece units 104R and 104L rotate in the opposite directions indicated by the arc arrows around their rotation central axes (OR, OL), and the eye width widens.

On the other hand, as one of the eyepiece units 104R and 104L is rotated toward the minimum eye width illustrated in FIG. 4C from the reference eye width state in FIG. 4A, the guide groove portion 207e in the first connecting member 207A is guided by the guide pin 210 and moves in the arrow E direction. The second connecting member 207B moves in the arrow G direction while the guide groove portion 207f is guided by the guide pin 210. Thereby, the eyepiece unit 104R receives couples Fa' and Fb' in parallel and in opposite directions, and the eyepiece unit 104L receives couples (not shown) in parallel and in opposite directions. Therefore, both the eyepiece units 104R and 104L rotate in the opposite directions indicated by the arc arrows around the rotation center axes (OR, OL), and the eye width narrows.

Similar to the first embodiment, the rattles are eliminated between the first and second connecting members 207A and 207B and the connecting shaft portions 108R and 108L by the biasing members 109R and 109L. Thereby, the operability of the user who adjusts the eye width improves, and the eye width can be smoothly adjusted. The above couples act by providing the connecting shaft portions 108R and 108L and the connecting shaft portions 108R' and 108L' at symmetrical positions with respect to the reference plane RP and the line H-H passing through the centers of the perpendiculars R-R and L-L. As a result, the position where the first and second connection members 207A and 207B intersect is prevented from being displaced in the vertical direction or the lateral direction.

As illustrated in FIG. 5, two head portions 210a and 210b provided on both sides of the guide pin 210 in the optical axis direction sandwich the bending portions of the first and second connection members 207A and 207B. Thus, even if a force that causes the first and second connection members 207A and 207B to bend in the optical axis direction acts on them when the eyepiece units 104R and 104L rotate, their bending is prevented.

Similar to the first embodiment, all of the connecting shaft portions 108R, 108R', 108L, and 108RL' are provided in a region between the perpendiculars R-R and L-L. Thereby, even if the eye width changes between the maximum eye width and the minimum eye width, the first and second connecting members 207A and 207B are prevented from entering optical paths from the objective optical systems 101R and 101L to the eyepiece optical systems 106R and 106L, respectively.

This embodiment disposes the intersecting portion (bending portion) with the first and second connection members 207R and 207L above the reference plane RP. This configuration can secure a large vacant space below the reference plane RP as compared with the first embodiment, and the body portion 110 can be thinner in the vertical direction than that in the first embodiment when the components in the body portion 110 and the battery compartment 150 are arranged in this vacant space.

This embodiment has described the first portions 207A1 and 207B1 of the first and second connection members 207A and 207B provided above the reference plane RP. However, the first portion may be provided below the reference plane, and the second portion may extend from the lower side to the upper side of the reference plane toward the eyepiece unit. This configuration can secure an empty space larger than that of the first embodiment above the reference plane.

The first and second embodiments have discussed the compression coil springs used as the biasing members 109R and 109L, but may use the leaf spring integrated with the first and second connection members. The first and second embodiments have described the connecting shaft portions 108R, 108R', 108L, and 108L' provided at the front end portions of the eyepiece units 104R and 104L. However, a frame member may be provided at the front end of the eyepiece unit, and the connecting shaft portion may be provided on the frame member. Then, it is equivalent to a case where the connecting shaft portion is directly provided to the eyepiece unit.

The first and second embodiments have described the first and second connection members 107(207)A and 107(207)B provided with connecting holes and connecting elongate hole portions, and the eyepiece units 104R and 104L provided with connection shafts. However, the connecting shaft portion may be provided to the first and second connecting members, and the connecting hole and the connecting elongate hole portion may be provided to the eyepiece unit. In this case, the biasing member is provided to the eyepiece unit.

As described above, the first and second embodiments can realize a compact and rattle-preventive eye width adjustment mechanism with small spaces occupied by the first and second interlock members in the body, and provide smaller binoculars.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, while the binoculars have been described as an example of the optical apparatus in each of the above embodiments, the same configuration as that described in each of the embodiments may be applied to optical apparatuses such as a microscope other than the binoculars.

Each embodiment can realize a compact and rattle-preventive eye width adjustment mechanism with small spaces occupied by the first and second interlocking members as movable members in the body, and provide the smaller binoculars.

This application claims the benefit of Japanese Patent Application No. 2018-95882, filed on May 18, 2018, which is hereby incorporated by reference herein in its entirety.

What is claimed is:
1. An optical apparatus comprising:
a body portion including an objective optical system for a right eye and an objective optical system for a left eye;
a right eyepiece unit and a left eyepiece unit respectively holding an eyepiece optical system for the right eye and an eyepiece optical system for the left eye; and
an eye-width adjuster configured to change a distance between the eyepiece optical system for the right eye and the eyepiece optical system for the left eye in an eye width direction by rotating the right eyepiece unit and the left eyepiece unit around different rotation center axes relative to the body portion,
wherein the eye-width adjuster includes:
a first connecting member configured to connect a connecting portion of the right eyepiece unit on one side of a reference plane and a connecting portion of the left eyepiece unit on an other side of the reference plane to each other where the reference plane is a plane including the rotation center axes of the right and left eyepiece units; and a second connecting member configured to connect a connecting portion of the right eyepiece unit on the other side of the reference plane and a connecting portion of the left eyepiece unit on the one side of the reference plane.

2. The optical apparatus according to claim 1, wherein the first and second connecting members are disposed between the objective optical systems for the right eye and the left eye and the eyepiece optical systems for the right eye and the left eye, and does not enter optical paths from the objective optical systems for the right and left eyes to the eyepiece optical systems for the right and left eyes when the distance changes between a maximum value and a minimum value.

3. The optical apparatus according to claim 1, wherein in each of the right eyepiece unit and the left eyepiece unit, the connecting portion to which the first connecting member is connected and the connecting portion to which the second connecting member is connected are disposed at equal distances from a respective rotation center axis.

4. The optical apparatus according to claim 1, further comprising a biasing member disposed in an elongate hole portion formed on each of the first and second connecting members, so that the biasing member biases the connecting portion of the right or left eyepiece unit.

5. The optical apparatus according to claim 1, wherein each of the first and second connecting members include a first portion extending on the one side of the reference plane, and a second portion bending and extending toward the other side of the reference plane with respect to the first portion.

6. The optical apparatus according to claim 1, wherein the optical apparatus is binoculars, and further comprises a battery compartment provided on the one side or the other side of a position where the first connection member and the second connection member intersect.

* * * * *